April 26, 1938.  J. J. STEWART ET AL  2,115,220
POWER PROPELLED CULTIVATOR
Filed Nov. 17, 1936

INVENTORS
JAMES JOSEPH STEWART
BERT THOMAS
By Young, Emery & Thompson
ATTORNEYS

Patented Apr. 26, 1938

2,115,220

UNITED STATES PATENT OFFICE 2,115,220

POWER PROPELLED CULTIVATOR

James Joseph Stewart and Bert Thomas, Gordonvale, Queensland, Australia

Application November 17, 1936, Serial No. 111,278
In Australia November 26, 1935

2 Claims. (Cl. 97—47)

This invention relates to power propelled cultivators and has for its object the provision of means whereby a motor driven chassis to which the cultivator is attached may be driven between rows of cane and the like and avoid damage to the cane whilst effectively and rapidly cultivating.

According to the invention an automobile chassis is used adapted to pass between standard rows of cane. Sheet iron guards are provided in front of and to the side of the front wheels to prevent the wheels and forward portion of the chassis coming into contact with cane which has got out of hand. The rear driving wheels are of larger diameter than the forward wheels. At the rear of the chassis a framework is hingedly connected to the chassis, or a prolongation thereof, and has secured to it a series of tine cultivators, the two outside tines being connected by levers and links to a hand lever mounted upon the chassis or framework for varying the distance between them, and thus allowing for variations in the width of the rows of cane. The framework carrying the tines is hinged at one end of the chassis, or prolongation thereof, and suspended from it and is raised or lowered by a hand lever and quadrant. The said lever is spring loaded enabling the depth of the tines to be set, and for enabling the cultivator tines to free themselves from any solid submerged object. In lieu of the tines small plows may be secured to the framework.

The invention will now be described with reference to the accompanying drawing, wherein:—

Figure 1:
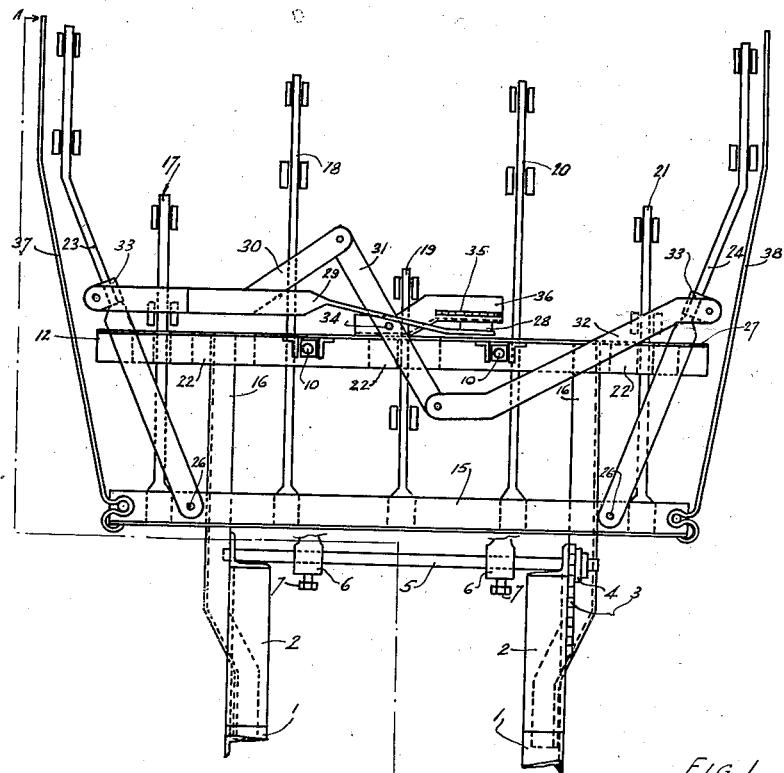
Figure 1 is a plan view showing the end of the chassis, and omitting the operating handles, spring lifting gear and lifting levers for clarity.
Figure 2:
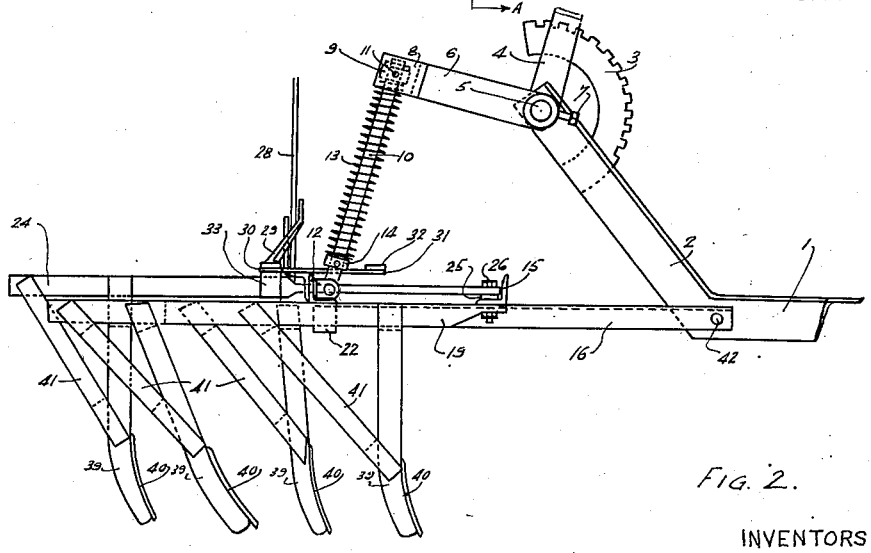
Figure 2 is a part sectional elevation on line A—A of Figure 1 omitting cane guards.

The invention may be applied to any form of motor vehicle chassis. The rear longitudinal members of the chassis may be lengthened or otherwise adapted for carrying the framework, or extensions may be bolted or otherwise secured to the chassis. In the drawing the longitudinal chassis members 1 are extended and bent upwardly as at 2. At the ends of the chassis extensions 2 we mount a quadrant 3 and pivot a lever 4 provided with pawl for engagement with the said quadrant 3. The said lever 4 is secured to a shaft 5 to which are attached two lifting arms 6 secured by set screws 7 which lifting arms 6 have forked ends 8 within each of which is pivoted a sliding collar 9 at the upper end of a tension rod 10. The said sliding collar 9 is held in its uppermost limiting position by fixed collar 11. The lower ends of the said tension rods 10 are held between fixed collars 14 at the bottom and sliding collar 9 at the top. The framework consists of two main cross members 12 and 15 and longitudinal members 16. The tine carrying arms 17, 18, 19, 20 and 21 at their inner ends are rigidly secured to cross member 15 by bolting or other means and near their middle portion are securely held to cross member 12 by sheaves 22. The two outer tine carrying arms 23 and 24 are, at their inner ends, pivoted to cross member 15 by pivots 26 and rest on pads 25. Near their middle portion these tine carrying arms 23 and 24 pass through slots in flange 27 on cross member 12. Tine carrying arms 23 and 24 are adapted to be moved laterally and radially about pivots 26 by means of hand lever 28 and links 29, 30, 31 and 32. Link 29 is pivoted to lever 28 and is secured to link 30 which latter is pivoted by bracket 33 to arm 23 and at its other extremity to link 31 by pivots about pin 34 at its centre and is pivotally connected to link 32 at its other end, link 32 being pivoted to bracket 33 on arm 24. The quadrant 35 is mounted upon the angle 36 upon cross member 12 and is adapted to be engaged by pawl on hand lever 28. Upon each side of the framework we provide springy members 37 and 38 secured at their ends to cross member 15. Tine brackets 39, forked at their upper ends, are secured to the tine carrying arms 17 to 24 inclusive, and at their lower ends are provided with means for attaching tines 40. Stays 41, forked at both ends, are secured respectively at their upper ends and lower ends to the tine carrying arms 17 to 24 inclusive and to tine brackets 39. Longitudinal members 16 of the frame are pivoted at their inner ends to chassis members 1 by pins 42 or other suitable means.

In operation when it is desired to raise the tines 40 from the ground the lever 4 is manipulated in a forward direction thereby turning shaft 5 and rotating arms 6 in an upward direction which lifts loose collar 9 thereby lifting rod 10. When it is desired to increase or decrease the width between the two outer tines the lever 28 is moved which in turn actuates the various links 29 to 32. Upon an obstruction being met tines 40 are enabled to rise by lifting the frame thereby forcing tension rod 10 up through sliding collar 9 which compresses spring 13 between sliding collar 9 and fixed collar 40. Upon the obstruction being passed the tines are forced back to their work by the said spring 13.

We claim:

1. The improvements in power propelled cultivators consisting of an extension of the chassis rear longitudinal members having upwardly bent ends; a quadrant secured to said upwardly bent ends of said chassis members; a shaft mounted at the ends of said chassis members; a hand lever secured to said shaft and a pawl upon said hand lever adapted to engage said quadrant; arms secured to said shaft; lifting rods pivoted to a framework at one end and passing through the ends of said arms; springs surrounding said rods between fixed collars at the bottom and sliding collars at the top, said sliding collars contacting with fixed collars upon the said rod; longitudinal members hinged at one end to the chassis; lateral members secured to said longitudinal members; inner tine carrying arms secured at their upper ends to the forward lateral member and secured near their middle to the other lateral member; two outer tine carrying arms pivoted at their upper ends to the forward lateral member and passing through slots in the rearward lateral member; links secured at one end to the said outer tine carriers and at the other end to a straight bar pivoted centrally and actuated by another lever connected to it and to the hand lever substantially as described.

2. A propelled cultivator as claimed in claim 1, in which the inner tine carrying arms are fixed against lateral radial movement, and the outer tine carrying arms have lateral radial movement substantially as described.

JAMES JOSEPH STEWART.
BERT THOMAS.